(12) United States Patent  
Heine et al.

(10) Patent No.: US 6,933,643 B1  
(45) Date of Patent: Aug. 23, 2005

(54) MULTIPLE RADIAL/AXIAL SURFACES TO ENHANCE FLUID BEARING PERFORMANCE

(75) Inventors: Gunter K. Heine, Aptos, CA (US); Mohamed Mizanur Rahman, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 8 days.

(21) Appl. No.: 10/350,559

(22) Filed: Jan. 23, 2003

Related U.S. Application Data

(60) Provisional application No. 60/351,641, filed on Jan. 23, 2002, provisional application No. 60/351,642, filed on Jan. 23, 2002.

(51) Int. Cl.[7] .............................................. H02K 7/09
(52) U.S. Cl. ...................................... 310/90.5; 310/90
(58) Field of Search ................................. 310/90.5, 90

(56) References Cited

U.S. PATENT DOCUMENTS

| | | | | |
|---|---|---|---|---|
| RE27,955 E | * | 4/1974 | Rosensweig ................ 310/90.5 |
| 4,254,961 A | * | 3/1981 | Fersht et al. ................. 277/410 |
| 5,223,758 A | * | 6/1993 | Kataoka et al. ............... 310/90 |
| 5,280,208 A | * | 1/1994 | Komura et al. ............... 310/90 |
| 5,533,811 A | * | 7/1996 | Polch et al. ................. 384/107 |
| 5,574,322 A | * | 11/1996 | Nii et al. .................... 310/90.5 |
| 5,587,617 A | * | 12/1996 | Dunfield et al. ........... 310/90.5 |
| 5,686,772 A | * | 11/1997 | Delamare et al. .......... 310/90.5 |
| 5,751,085 A | * | 5/1998 | Hayashi ....................... 310/90 |
| 5,791,784 A | * | 8/1998 | Ichiyama .................... 384/107 |
| 6,081,057 A | | 6/2000 | Tanaka et al. ................. 310/90 |
| 6,130,802 A | | 10/2000 | Rahman et al. .......... 360/99.08 |
| 6,137,650 A | | 10/2000 | Heine et al. .............. 360/98.07 |
| 6,292,328 B1 | | 9/2001 | Rahman et al. .......... 360/99.08 |
| 6,307,291 B1 | * | 10/2001 | Iwaki et al. .................. 310/90 |
| 6,307,293 B1 | * | 10/2001 | Ichiyama ................... 310/90.5 |
| 6,322,252 B1 | | 11/2001 | Grantz et al. ............... 384/124 |
| 6,371,650 B1 | * | 4/2002 | Goto et al. ................. 384/110 |
| 6,664,687 B2 | * | 12/2003 | Ichiyama ................... 310/90.5 |

* cited by examiner

*Primary Examiner*—Dang Le  
(74) *Attorney, Agent, or Firm*—Morrison & Foerster LLP

(57) ABSTRACT

In one embodiment, a plurality of axially oriented bearings defined along gaps between rotor and stator are provided to provide radial stiffness to the system; and these bearings are coupled together by radially oriented gaps. Grooves and/or magnets may be defined in order to maintain the stability and relative spacing of the gaps, while allowing free relative rotation of parts of the system with minimum power loss. A central conical bearing may be provided, having a fluid dynamic bearing around its conical surface, and being connected to an axially parallel but radially displaced axially oriented journal style bearing. The combined effects of these bearings is sufficient to maintain or even enhance the overall stability of the system.

20 Claims, 7 Drawing Sheets

MULTIPLE RADIAL/AXIAL SURFACES TO ENHANCE FLUID BEARING PERFORMANCE

CROSS-REFERENCE TO RELATED APPLICATIONS

This invention is based on U.S. provisional patent application Ser. No. 60/351,641, filed Jan. 23, 2002, by Gunter K. Heine and Mohamed Mizanur Rahman and on U.S. provisional patent application Ser. No. 60/351,642, filed Jan. 23, 2002 by Gunter K. Heine and Mohamed Mizanur Rahman. The priority of these applications is claimed and the applications are incorporated herein by reference.

FIELD OF THE INVENTION

This invention relates generally to the field of fluid dynamic bearings, and more specifically to a design incorporating multiple fluid dynamic bearings to provide enhanced balance and rotational stability in the system.

BACKGROUND OF THE INVENTION

Disc drives are capable of storing large amounts of digital data in a relatively small area. A disc drive stores information on one or more spinning recording media. The recording media conventionally takes the form of a circular storage disk with a plurality of concentric circular recording tracks. A typical disk drive has one or more disks for storing information. This information is written to and read from the disks using read/write heads mounted on actuator arms that are moved from track to track across a surface of the disk by an actuator mechanism.

Generally, the disks are mounted on a spindle that is turned by a spindle motor to pass the surfaces of the disks under the read/write heads. The spindle motor generally includes a shaft supported from a base plate, and a hub to which the spindle is attached having a sleeve into which the shaft is inserted. Permanent magnets, which are typically attached to the hub, interact with a stator winding to rotate the hub relative to the shaft. This description is consistent with a fixed shaft motor; however, the invention to be described below is as easily useable with a motor comprising a rotating shaft, an end of the shaft supporting the hub for rotation to support the rotation of the disks.

In either case, to facilitate rotation and for best drive performances, one or more bearings are disposed between the hub or sleeve and the shaft.

Over time, disk drive storage density has tended to increase, and the size of the storage system has tended to decrease. This trend has led to greater emphasis on restrictive tolerances in the manufacturing and operation of magnetic storage disk drives. For example, to achieve increased storage density, read/write heads must be placed increasingly close to the surface of the storage disk.

As a result, the bearing assembly which supports the storage disk is of critical importance. A typical bearing assembly of the prior art comprises ball bearings supported between a pair of bearing races which allow a hub of a storage disk to rotate relative to a fixed member. However, ball bearing assemblies have many mechanical problems such as wear, run-out and manufacturing difficulties. Moreover, resistance to operating shock and vibration is poor because of insufficient damping.

An important measure of the operating effectiveness of a fluid dynamic bearing motor is the stiffness to power ratio, where stiffness gives the ability of the system to perform better dynamically, and power is a measure of power consumed to start rotation and maintain the constant speed and rotation of the motor. Most known fluid dynamic bearings today in commercial use are made with oil as the fluid which is maintained in the bearing gap between the two relatively rotating surfaces. This maintains the proper stiffness and damping of the bearing which reduce non-repeatable run-out due to shock and vibration; however, because of the relatively high viscosity of such fluids, especially at lower temperatures such as at startup, considerable power is consumed to establish and maintain high speed rotation.

Finally, to maintain the required axial and radial stiffness and damping of the bearing, some minimum length of a journal and width or diameter of a cone or surface area of a cone or width or diameter of a thrust plate must be devoted to grooved surface, against which pressure can come to bear to maintain the stiffness and damping of the system. Therefore, typically known bearing systems have had a plurality of fluid dynamic bearings in series. For example, known systems include two conical bearings spaced along a shaft in cooperating to provide both axial and radial stiffness and damping; or a shaft with a thrust plate, with the journal bearings on the shaft and the thrust bearings on the thrust plate being arrayed in series to operatively cooperate and maintain the stiffness and damping of the system. However, all of this leads to fairly high profile designs to accommodate these serially arrayed bearings; the smaller disk drives which are the designed target for use in portable computers and the like cannot accommodate high profile drives.

SUMMARY OF THE INVENTION

Therefore, it is an object of the invention to provide a bearing design in which stiffness and damping is maintained, but a lower power is achieved.

It is a further objective of the invention to provide a design in which wider bearing gaps may be used because the overall length of the bearing system is enhanced, without adding to the overall height of the system and machining capability and bearing performances are not hurt by bigger gap tolerances.

These and other objectives and advantages of the present invention are achieved by providing plural fluid dynamic bearings arrayed in parallel with one another and typically connected to one another along a common gap. In one embodiment, a plurality of axially oriented bearings defined along gaps between rotor and stator are provided to provide radial stiffness to the system; and these bearings are coupled together by radially oriented gaps. Grooves and/or magnets may be defined in order to maintain the stability and relative spacing of the gaps, while allowing free relative rotation of parts of the system with minimum power loss.

In a further alternative, a central conical bearing may be provided, having a fluid dynamic bearing around its conical surface, and being connected to an axially parallel but radially displaced axially oriented journal style bearing. The combined effects of these bearings is sufficient to maintain or even enhance the overall stability of the system.

In alternative embodiments, a plurality of generally axial, angularly oriented journal bearings may be provided, grooves on the facing surfaces of the gaps maintaining pressurization of the fluid to maintain the spacing and stiffness of the system. These axial or angularly oriented gaps are connected by generally radial connecting gaps; magnets or the like may be located adjacent these radial gaps to maintain the spacing of the gap and the relative orientation of the parts supporting the sides of the fluid bearings.

In an alternative approach or an approach in combination with these magnets along bearing gaps, the motor stator may be displaced relative to the motor magnet to establish either an axial or radial bias which would operate to maintain the spacing across the gaps within the fluid bearing system.

Other features and advantages of the invention will become apparent to a person of skill in the art who studies the following description of some exemplarian embodiments given with reference to the following drawings.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

Figure 1:
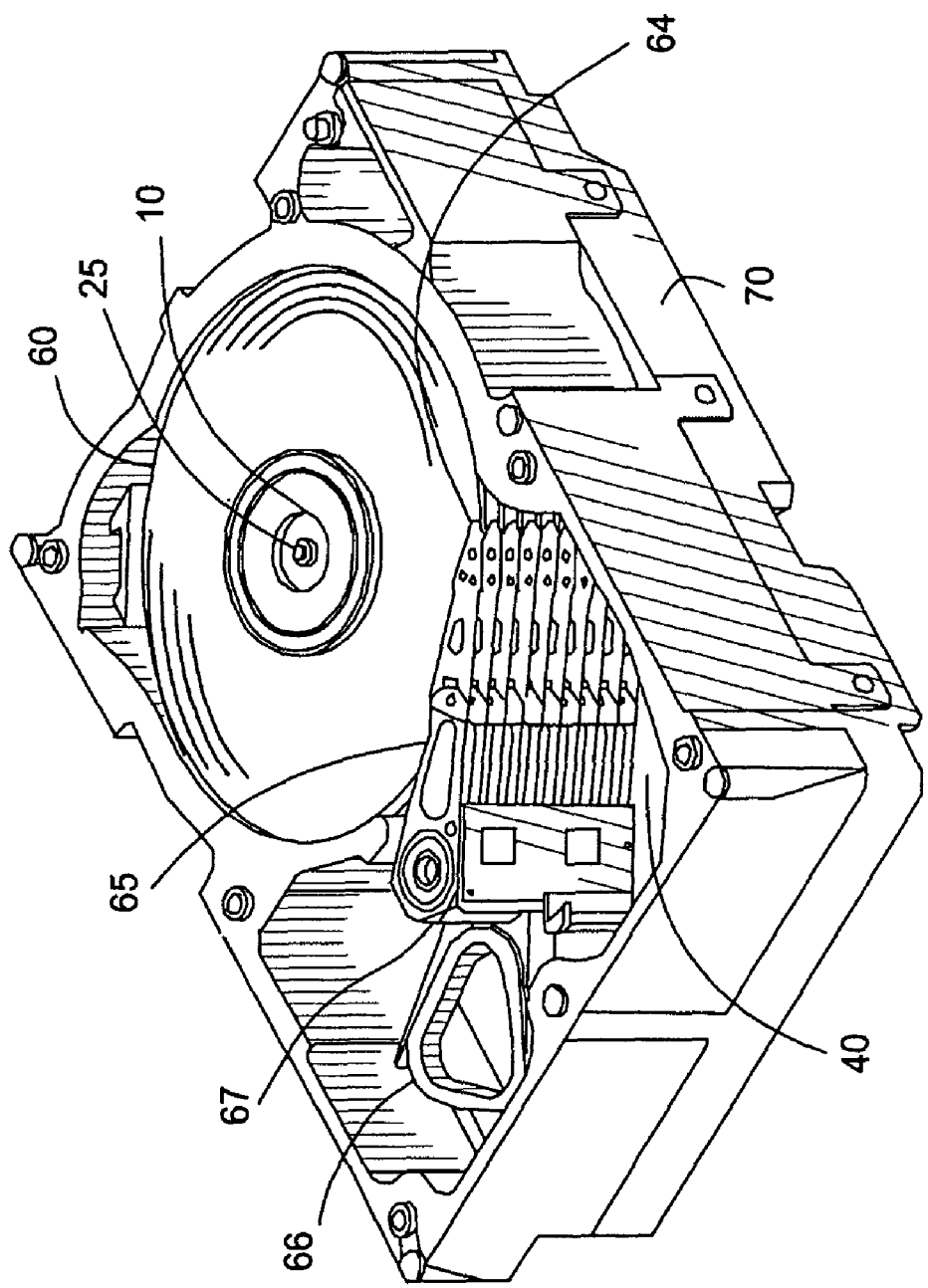
FIG. 1 is a perspective view of a disk drive in which the bearing system of the present invention is especially useful.

FIG. 1 illustrates an example of a magnetic disk drive in which the invention may be employed. At least one magnetic disk 60 having a plurality of concentric tracks for recording information is mounted on a spindle 10. The spindle is mounted on spindle support shaft 25 for rotation about a central axis. As the disks are rotated by the motor, a transducer 64 mounted on the end of an actuator end 65 is selectively positioned by a voice coil motor 66 rotating about a pivot axis 67 to move the transducer 64 from track to track across the surface of the disk 60. The elements of the disk drive are mounted on base 40 in a housing 70 that is typically sealed to prevent contamination (a top or cover of housing 70 is not shown). The disks 60 are mounted on spindle 10.

Figure 2:
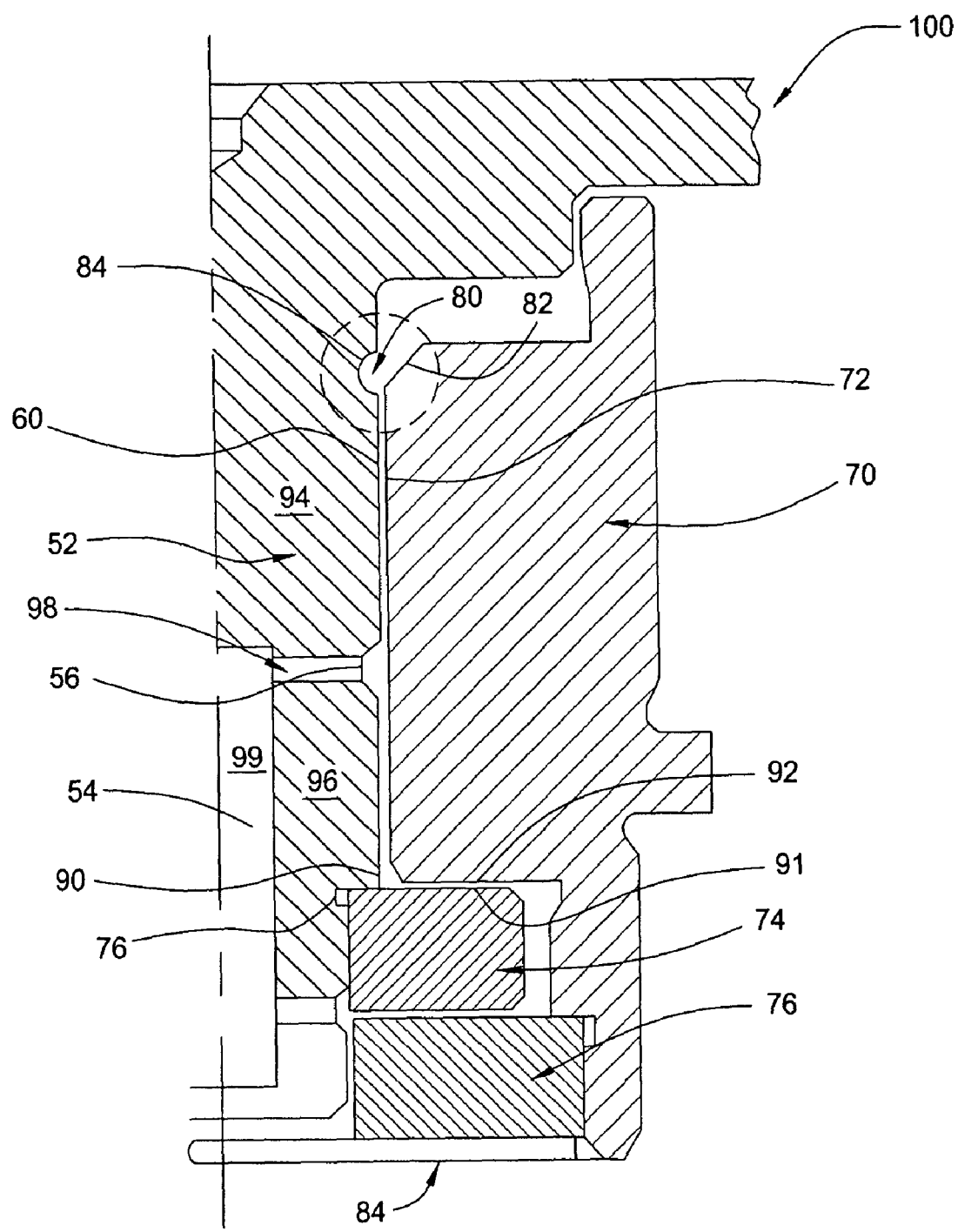
FIG. 2 is a plan sectional view of a known bearing system as used in the prior art.
Figure 3:
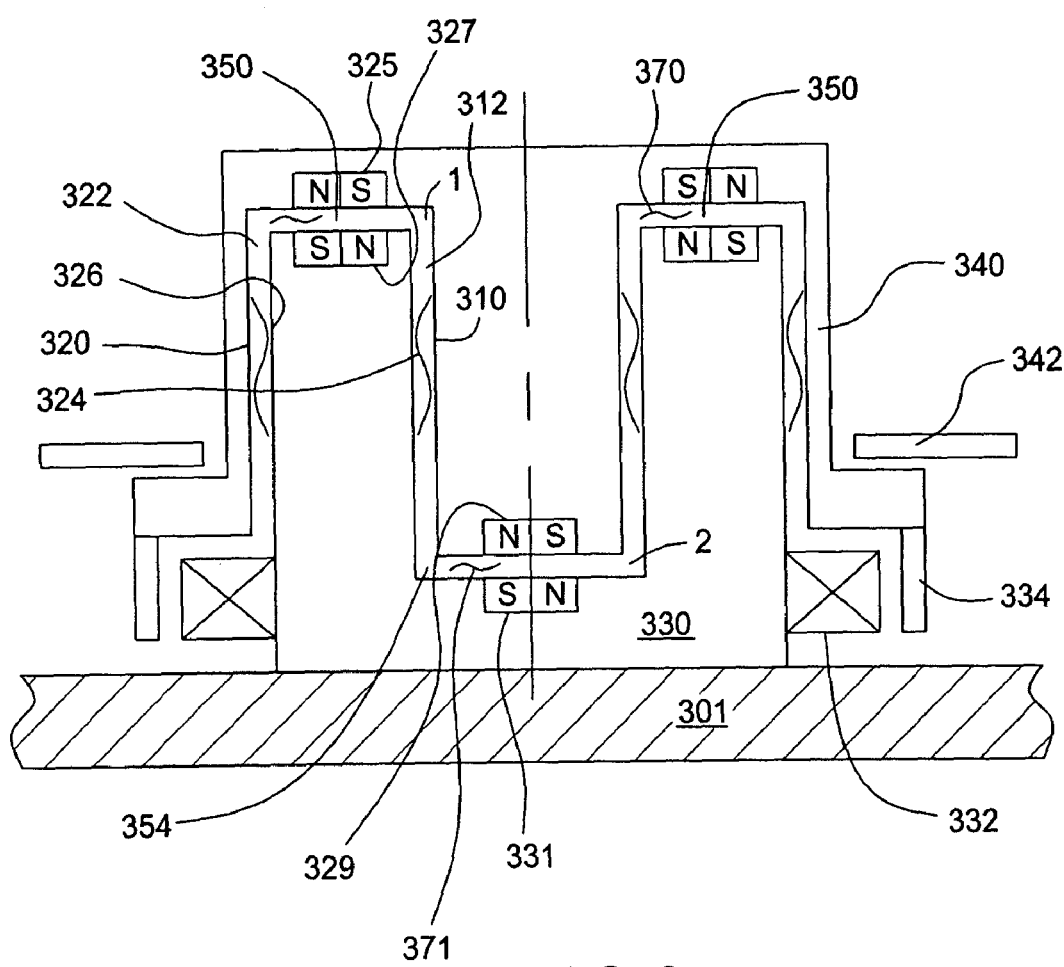
FIGS. 3, 4, 5, 6 and 7 are schematic views of various embodiments of the invention, each including fluid dynamic bearings in parallel.
Figure 4:
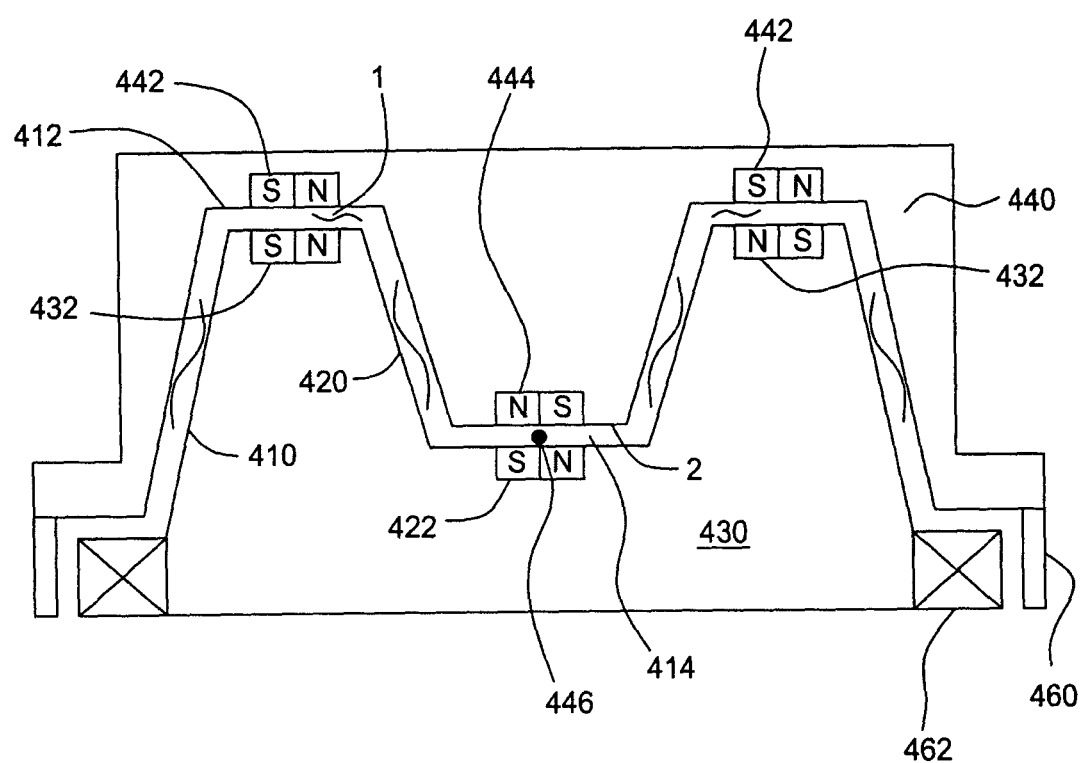
Figure 5:
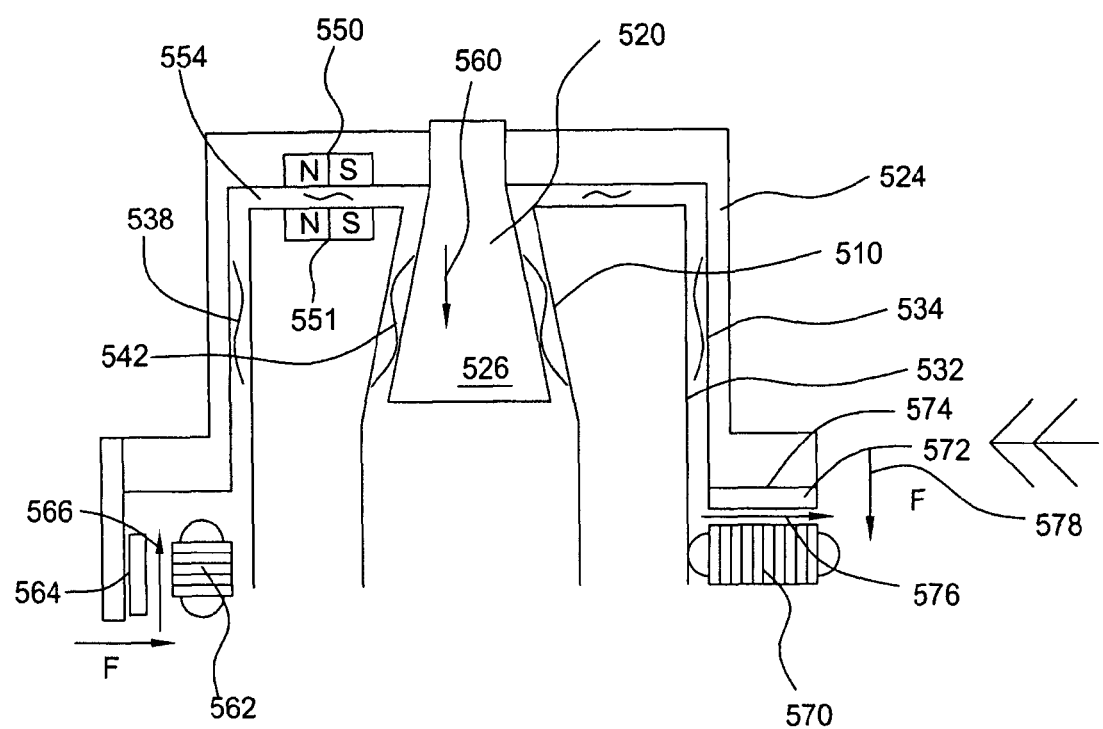

FIG. 2 illustrates a portion of a fluid dynamic bearing motor 100 that may be adapted to benefit from embodiments of the present invention. The motor 100 includes a shaft 52 that rotates within a stationary sleeve 70. The rotating shaft 52 includes a reservoir 54 that supplies fluid through a groove 56 to the surface of a fluid dynamic bearing. The fluid dynamic bearing itself is formed between the outer surface 60 of the shaft 52 and the inner surface 72 of the sleeve 70, which rotate relatively. The upper journal bearing surface 94 of the bearing terminates in a region generally indicated at 80 where the incline surface 82 slopes away from the recess 84 in the surface 60 to form a meniscus that will hold the fluid within the bearing. The upper journal surface 94 is separated from the lower journal bearing surface 96 by a bore 98 in the shaft 52 that feeds a fluid reservoir 99 defined within the shaft 52. The lower journal bearing surface 96 of the bearing terminates at a region generally indicated at 90 where the rotating shaft meets a thrust plate 74, the surface 60 including a recess 76 for enabling the joining of the thrust plate 74 to the rotating shaft 52. The thrust plate 74 includes a surface 91 facing surface 92 across a gap to form a thrust bearing. Referring next to FIGS. 3, 4 and 5, these figures illustrate schematic examples of exemplary embodiments of the fluid dynamic bearings of the present invention. These include plural bearings in parallel, to minimize the height which must be provided to allow for effective bearing length to maintain the required stiffness and damping whereby the stability of the system in all dimensions.

Referring to FIG. 3, it can be seen that as compared to the prior art where two bearings are provided in series, in this embodiment two axial journal bearings 310, 320 defined along parallel gaps 312, 322 are provided. The necessary pressures to support rotation are established by grooves 324, 326 on one of the defining surfaces of the gap. The base 330 supports the stator windings 332 adjacent magnet 334; activation of the windings causes rotation of the hub 340. This hub 340 can support one or more disks 342 for constant speed rotation under the urging of electrical signals supplied to the stator windings 332.

In order to maintain the hub 340 seated on the stator 330 and the gap properly aligned, either magnet pair 325, 327 or magnet pair 329, 331 may be provided on either side of the gaps which couple the axial fluid bearings 320, 310. These magnets would face each other across a fluid or gas filled gap 350, 354 so that the hub 340 and stator 330 would remain properly axially spaced and coupled together. The magnets could be sized to maintain the size of the gap, which could be filled with a fluid or gas to support relative rotation of the two elements. In operation, relative rotation of the grooved regions (370 or 371) that form fluid dynamic bearings creates axial forces of a thrust bearing to support relative rotation of stator and rotor; to prevent the gap at the fluid bearing from becoming too large, axially aligned magnets are provided facing each other across the same gap, and creating a force which is axially opposed to the axial force of the fluid bearing.

In the embodiment of FIG. 3, the magnets, either magnetic pair 325, 327, or magnet pair 329, 331 are provided on either side of an axial gap. If the magnets 325, 327 are provided they are generally annular in shape, having a central axis which is in common with the center axis of the entire system. In either case, the magnets are sized and positioned to provide an attractive force across the gap where they are located; the fluid bearing gap of the journal and thrust bearings, to maintain the gap spacing. Two different arrangements are possible with the design of FIG. 3. If the magnet pair 329, 331 is provided at the central axis of the gap, then the grooves 370 would be provided in the distant (annular) gap section 370. Under non-spinning conditions, the groove surfaces at the gap section 370 would be in contact with each other, but not the magnetic surfaces, that is the axial gap surfaces where the magnets 329, 331 are located. Under spinning conditions, the groove surfaces at section 370 would spin up out of contact and establish a gap which could be optimized for performance of the system, with the magnets 329, 331 being attractive magnets limiting the size of the groove bearing gap by their attractive force.

The opposite condition is also possible. The magnets 325, 327 are provided attractive to each other across the annular axial annular gap 350 and the grooves 371 are provided at the centerline gap. The groove surfaces of gap 371 rest upon each other in the rest condition, but the magnet surfaces do not, as it would become too difficult to spin up the system.

When the system spins up, then the gap at grooves 371 would be established, with an axial extent limited by the attractive force of magnets 325, 327.

It should be noted that the magnet 334 which is a part of the motor could be offset from the stator 332 to either supplement or diminish this magnetic attractive force in order to further find tune the size of the gap.

In similar fashion, as shown in FIG. 4, generally axial but angular gaps 410, 420 could be defined connected by radial gaps 412, 422. As in the previous example, the stator 430 supports the hub 440 for rotation by virtue of the grooved fluid dynamic bearings 410, 420. The angular nature of the gaps provides both axial and radial support for the system. The hub and stator are kept together in proper axial alignment and the fluid bearing gaps kept in proper spacing by the provision of magnets 432, 442 facing each other across the radial gap 412, and/or magnets 444, 446 located at or near the center line of the system. As in the previous design, air or fluid may be provided in this gap to maintain the separation of these parts to provide for non-frictional relative rotation; and in this embodiment it is further shown that the grooves that define the bearings 410, 420 may be axially offset from one another. As with the previous embodiment, the rotation of the hub 440 relative to the stator 430 is achieved by the interaction of magnet 460 and stator windings 462 which are energized in a known fashion. As will be explained below with reference to FIG. 5, the axial and/or radial alignment of the hub 440 and stator 430 can also be achieved and/or maintained, in whole or in part, by an offset of the magnetic interaction between the stator 462 and its associated magnet 460.

The axial forces generated in the bearing gaps 410 and 420 are used to support in part separation of the system's rotor 440 from stator 430 and thereby the reliable operation of the system. Therefore, considering the possibilities, in one approach the magnets 444, 446 would be provided across gap 422, and grooves would be provided in gap 412. Under this condition the magnets 444, 446 would provide an attractive force across the gap; this force would operate in opposition to the force generated by the grooves at gap 412, restraining excessive separation across that gap.

Alternatively, the magnets 442, 432 could be provided, with grooving in the gap 414. In this case, the magnets also would be attractive, and the grooved surfaces 414 would operate to create an axial separating force which would be counter-balanced by the magnetic attraction force. In each case, the magnetic axial attraction balances the axial forces generated by the grooved bearing. In each of these cases, the magnetic attraction force from the magnets located at the gap could be supplemented or diminished by an offset between the magnet 460 and stator 462 of the rotational propulsion motor.

Also because of the presence of grooves in the gaps 410, 420 which are angled with respect to the vertical axis, these grooves will create an axially directed force under rotational conditions. Therefore, since under rotating conditions these grooves will be active in creating an axial force which would cause the hub/rotor 440 to separate from the base 430, then several alternatives are possible with respect to the magnet placement without further grooving in the gap regions 412, 414 being required. Either magnets 442 and 432 could be provided; or magnets 444 and 446 could be provided to generate an attractive force; or both sets of magnets could be provided. In all instances, because of the axial force being generated in gaps 410, 420, no grooving is required in the gaps 412, 414. Again, the magnetic force of these magnets can be modulated by an offset of magnet 460 relative to stator 452.

FIG. 5 illustrates a further alternative of the present invention in schematic format. In this alternative, the angular dynamic bearing 510 is defined by an internal cone 520 which supports the hub 524 on an end thereof. The surface 526 of the cone 526 defines with an interior surface of the sleeve or stator 530 a conical bearing 542 capable of generating both radial and axial forces. An exterior surface 532 of the sleeve cooperates with an interior surface 534 of the hub to define a radial bearing gap 538. This bearing gap 538 has grooves on at least one wall surface thereof, defining a journal bearing. The combination of this bearing and the conical bearing 510 which is established by grooves 542 provides both radial and axial stability to the system. However, to further enhance the stability of the system it may be desirable to provide annular magnets 550 on the axially upper and lower surfaces of the radial gap 554 to maintain the gap and maintain the stability of the rotor 524 relative to the stator 530.

The conical bearing 542 generates both axial and radial forces in rotation. Therefore, the axial component of these fluid bearing forces would typically generate forces in opposition to the attractive force of the magnets. In this embodiment, the magnets at 550, 551 which are annular about the central axis 501 of the design are in opposition so that when the system is at rest the magnetic surfaces do not rest upon each other. When the system rotates, the conical bearing surface moves away from sleeve 530, closing down the gap of the bearing 542. In rotation, as the conical bearing 526 rotates, axial forces are generated in the direction of arrow 560, the axial force acting in opposition to the repulsive force of the magnets 550, 551 to properly set the conical bearing gap for optimum operation while the facing surfaces which carry the magnets 550, 551 remain separated.

Of course, magnets 550, 554 could be eliminated. As alternatives, grooves 521 could be in the same gap, creating pressure against arrow 560; or the bias from magnet 564 could be used.

It should be noted that the bearings in all of the figures could be multi-fluid bearings. In each case, either the inner bearings could be liquid with the outer bearing being air; or both could be liquid, with different liquids being possible, separated by capillary seals or other seals effective in such operation, or both bearings could be air.

This stability and positioning is further enhanced by a modification of the active sections of the motor generally indicated at 560 as comprising stator laminations and windings 562 and associated magnet 564. In a first embodiment on the left side of the figure, the windings 562 are offset from the magnet 564 to establish a force as indicated by the vector 566 which relatively positions the hub and the stator in the axial direction. In an alternative approach, the stator is repositioned or rotated 90° relative to the hub so that now the stator 570 and its laminations and windings lies primarily in the radial place and is now associated with a magnet 572 and axial surface 574 of hub 524. By adopting this orientation, forces may be established as indicated by the vectors 576, 578 to position the hub relative to the stator in both the axial and radial directions.

In all of these embodiments, fluid is typically found in the gaps indicated by the grooves which are shown in each of the figures; as is known in this technology, capillary seals would be found at either end of these fluid sections. In this way, different liquids could be used in different bearing sections along the same gaps or liquid could be the fluid in an inner bearing, with air in an outer bearing; or air could be used in all bearings.

Other alternatives are also available. For example, where the outer bearing is an axial journal bearing such as bearing 320 in FIG. 1 then this can have a larger gap than the inner bearings.

Also, in all the above embodiments, the outer bearing can be established with a net pumping pressure toward the inner bearing. For example, in FIG. 4, the bearing 410 may have a net pumping effect toward bearings 412, 420, 422. This bearing thereby actgs as a seal for the inner bearings. This effect also reduces the lubricant evaporation and increases the load carrying capacity of the inner bearing. For example in FIG. 4, as bearing 410 pumps inward into the bearing system, increasing the pressure in bearings generating axial force such as bearings 412, 414.

Figure 6:
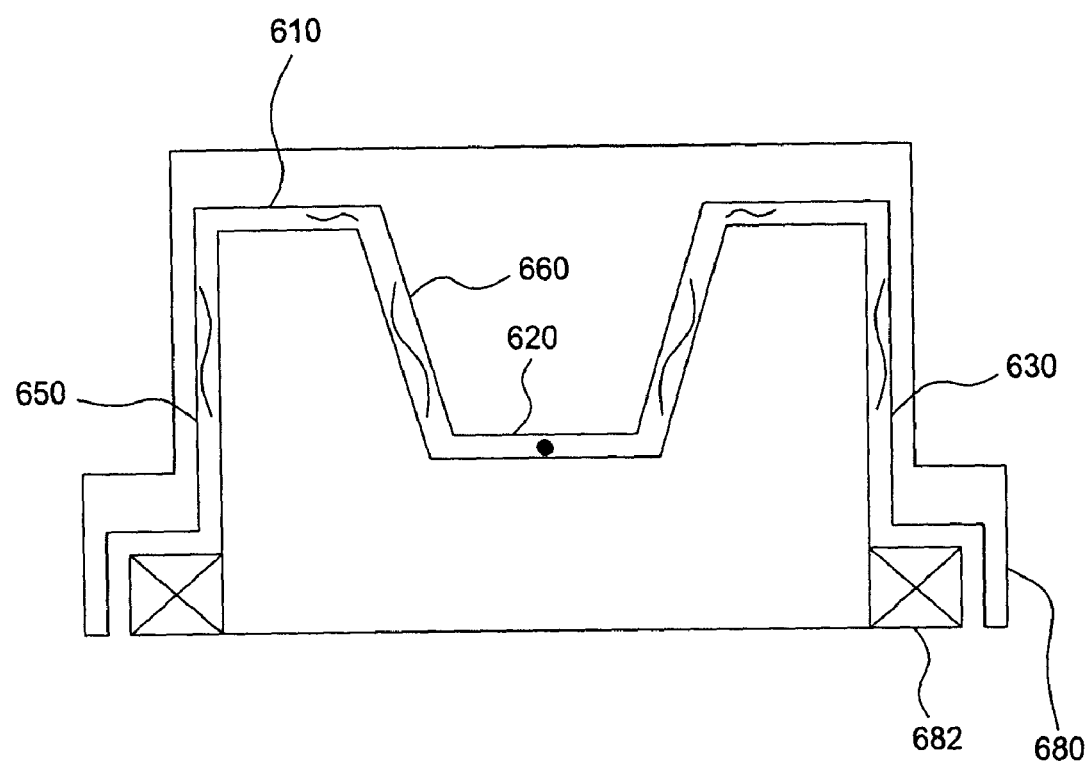
Figure 7:
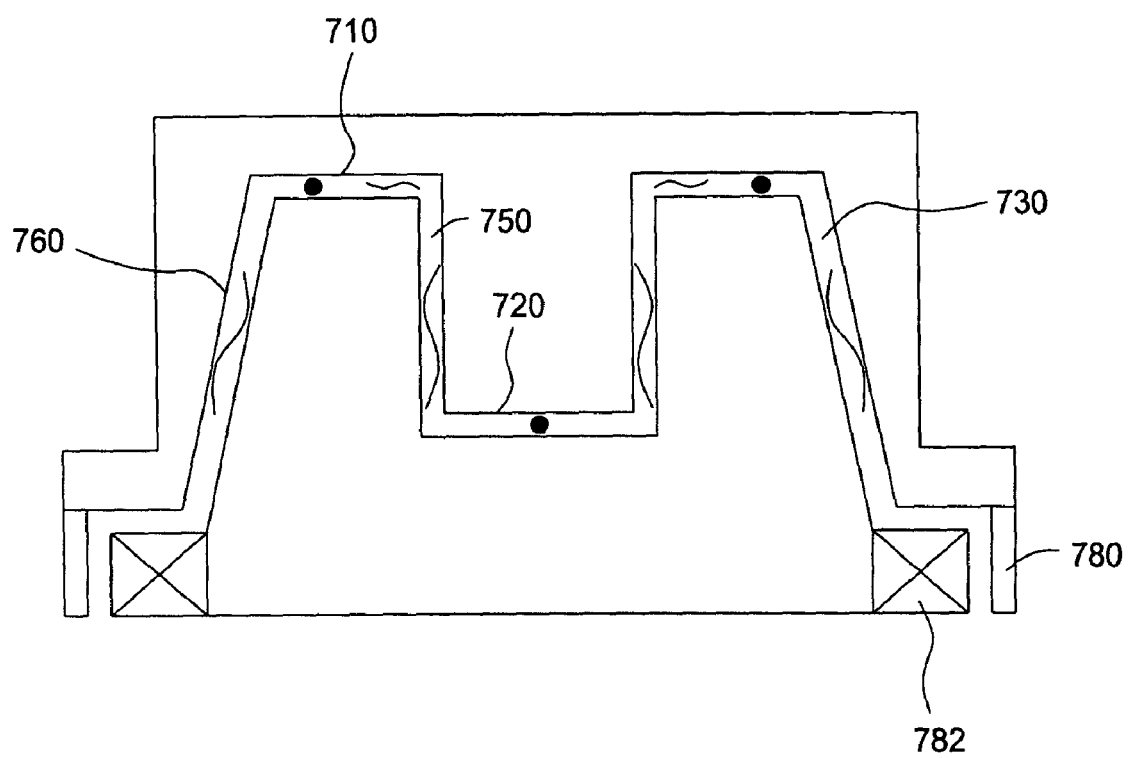

Further, alternative embodiments appear in FIGS. 6 and 7. In these two axial sections 610, 620 or 710, 720 are provided in parallel along a common gap, 630, 730 and plural journal bearings 640, 650 or 740, 750 are provided along the same gap which rather than being parallel include one axial journal bearing 650, 750 and one bearing 660, 760 at a shallow angle to the axis.

As in the other embodiments, grooves are provided in one of the axial sections. The other typically has attracting magnets on either axial side to control gap width in operation. However, these magnets may be omitted, or supplemented, by magnetic bias created by offsetting magnet 682 from stator 782.

Further, some physical restraint such as a shoulder, retaining clip ring or the like is typically incorporated in all the above designs to prevent axial separation under shock or other circumstance.

While foregoing is directed to the preferred embodiment of the present invention, other and further embodiments of the invention may be devised without departing from the basic scope thereof, and the scope thereof is determined by the claims that follow.

What is claimed is:

1. A fluid dynamic bearing system for supporting relative rotation between a stator and a rotor, this system comprising at least first and second fluid dynamic bearings having a common fluid dynamic bearing gap and magnetic bias means in series with the fluid dynamic bearings to control the fluid dynamic bearing gap during rotation of the system, the fluid dynamic bearings being arrayed substantially in parallel with one another.

2. A fluid bearing system as claimed in claim 1 wherein the first and second bearings are at same or variable angle to the axis of rotation of the rotor and stator.

3. A fluid bearing system as claimed in claim 2 wherein each of the fluid dynamic bearings comprises grooves on one of the surfaces of the rotor and stator which define the bearings.

4. A fluid bearing system as claimed in claim 2 wherein the first fluid dynamic bearing includes a first annular thrust bearing, and the magnetic bias means comprise magnets on either side of the fluid dynamic bearing gap operating in attractive mode to control the axial extent of the gap.

5. A fluid dynamic bearing system as claimed in claim 4 wherein the first annular thrust bearing is annular and about the centerline of the system, and the magnetic bias means are located on the fluid dynamic bearing gap at the centerline of the system.

6. A fluid bearing system as claimed in claim 4 wherein the first annular thrust bearing is at the centerline of the system, and the magnetic bias means comprise annular magnets located on either side of the fluid dynamic bearing gap and surrounding the center axis of the system.

7. A fluid bearing system as claimed in claim 2 including an annular magnet on either side of the fluid dynamic bearing gap intermediate the first and second variable angle fluid bearing means, the variable angle fluid bearing means being connected at the center axis by a region without grooves or magnetic biasing.

8. A fluid bearing system as claimed in claim 2 including magnets on either side of the fluid dynamic bearing gap operating in the attractive mode and located at the central axis of the bearing system on either side of a gap connecting the variable angle fluid bearings.

9. A fluid dynamic bearing system as claimed in claim 1 wherein the first fluid bearing includes at least one annular thrust bearing, and the magnetic bias means comprise magnets on either side of the fluid dynamic bearing gap operating in attractive mode to control the axial extent of the fluid dynamic bearing gap.

10. A fluid dynamic bearing system as claimed in claim 9 wherein the thrust bearing is annular and about the centerline of the system, and the magnetic bias means are located on either side of the fluid dynamic bearing gap around the centerline of the system.

11. A fluid bearing system as claimed in claim 9 wherein the thrust bearing is at the centerline of the system, and the magnetic bias means comprise annular magnets located on either side of the fluid dynamic bearing gap and surrounding the center axis of the system.

12. A fluid bearing system as claimed in claim 9 wherein the first fluid dynamic bearing comprises axially oriented journal bearings along the fluid dynamic bearing gap of the bearing system intermediate the fluid dynamic bearing and the magnetic bias means.

13. A fluid bearing system as claimed in claim 9 wherein the magnetic bias means further includes a magnet supported from the rotor and offset relative to the stator to further influence the fluid dynamic bearing gap between the rotor and the stator as established by the magnetic bias means.

14. A fluid bearing system as claimed in claim 1 wherein the first fluid dynamic bearing comprises a conical bearing defined between a conical outer surface of a rotor supporting a hub for rotation and an inner surface of the stator comprising a sleeve, and the magnetic bias means comprise annular magnets arranged on either side of the fluid dynamic bearing gap surrounding the central axis of the conical bearing and being attractive to each other across the fluid dynamic bearing gap to control the fluid dynamic bearing gap of the conical bearing in rotation.

15. A fluid bearing system as claimed in claim 14 wherein the second fluid bearing comprises a journal bearing distal from the conical bearing and parallel to the central axis of the conical bearing.

16. A fluid dynamic bearing as claimed in claim 1 wherein the first and second fluid bearings are liquid, and the magnetic bias means gap is air.

17. A fluid dynamic bearing system as claimed in claim 1 wherein the fluid dynamic bearings are air, and the gap of the magnetic bias means is liquid.

18. A fluid dynamic bearing system for supporting relative rotation between a stator and a rotor, this system comprising at least first and second fluid dynamic bearings having a common fluid dynamic bearing gap and magnetic bias means in series with the fluid dynamic bearing gap to control the fluid dynamic bearing gap during rotation of the system, the fluid dynamic bearings being arrayed substantially in parallel with one another.

19. A fluid bearing system as claimed in claim 18 wherein the first and second bearings are at same or variable angle to the axis of rotation of the rotor and stator.

20. A fluid bearing system as claimed in claim 19 wherein each of the fluid dynamic bearings comprises grooves on one of the surfaces of the rotor and stator which define the bearings.

* * * * *